(12) United States Patent
Berkeley et al.

(10) Patent No.: US 12,130,069 B2
(45) Date of Patent: Oct. 29, 2024

(54) VEHICLE REFRIGERATION SYSTEM FOR FOOD CARTS

(71) Applicants: Peter Berkeley, Naples, FL (US); Derek Bartlett, Naples, FL (US)

(72) Inventors: Peter Berkeley, Naples, FL (US); Derek Bartlett, Naples, FL (US)

( * ) Notice: Subject to any disclaimer, the term of this patent is extended or adjusted under 35 U.S.C. 154(b) by 168 days.

(21) Appl. No.: 17/893,958

(22) Filed: Aug. 23, 2022

(65) Prior Publication Data

US 2024/0068734 A1    Feb. 29, 2024

(51) Int. Cl.
*F25D 17/08* (2006.01)
*F25D 11/00* (2006.01)

(52) U.S. Cl.
CPC ............. *F25D 17/08* (2013.01); *F25D 11/00* (2013.01)

(58) Field of Classification Search
CPC ......... F24F 2221/22; F24F 8/22; A47B 31/02; B64D 11/007; B64D 11/04; F25D 11/00; F25D 17/08
See application file for complete search history.

(56) References Cited

U.S. PATENT DOCUMENTS

| | | |
|---|---|---|
| 3,042,384 A | 7/1962 | Bauman |
| 4,361,014 A | 11/1982 | Blain |
| 4,726,196 A | 2/1988 | Zajic |
| 5,404,935 A | 4/1995 | Liebermann |
| 8,474,274 B2 | 7/2013 | Schalla et al. |
| 8,845,782 B2 | 9/2014 | Metteer |
| 9,062,909 B2 | 6/2015 | Lu et al. |
| 9,487,299 B2 | 11/2016 | Oswald et al. |
| 9,630,472 B2 | 4/2017 | Francois |
| 9,840,125 B2 | 12/2017 | Burd |
| 9,924,833 B2 | 3/2018 | Rigaud et al. |
| 9,957,050 B2 | 5/2018 | Moran |
| 10,407,173 B2 | 9/2019 | Vandyke et al. |

(Continued)

FOREIGN PATENT DOCUMENTS

KR    102304610 B1    9/2021

OTHER PUBLICATIONS

Duct and Dampers Heating, Air Conditioning, Ventilation and Air Distribution Products, UV Light Duct Lamps: Purifiers, https://web.archive.org/web/20201025213601/https://ductanddampers.com/catalog/UV-Light-Duct-Lamps-Purifiers; archived Oct. 25, 2020, accessed from the internet Apr. 2, 2024. (Year: 2021).*

*Primary Examiner* — Cassey D Bauer
(74) *Attorney, Agent, or Firm* — Mark Terry (57) ABSTRACT

A system for temperature-controlled transport of food on a vehicle includes food carts including an opening for ingress of air and an opening for egress of air and a refrigeration system including air ducts configured to convey pressurized air from the refrigeration unit to the food carts, including air outlets configured to interface with the food carts, air ducts configured to convey air from the food carts to the refrigeration unit, including air inlets configured to interface with the food carts, wherein the air outlets and air inlets include a spring-loaded valve configured for automatically opening when a food cart rests against the valve, and for automatically closing when said food cart no longer rests against the valve, one or more fans configured for circulating air within the air ducts, and, an ultraviolet (UV) light sterilization system located within the air ducts.

20 Claims, 6 Drawing Sheets

(56) References Cited

U.S. PATENT DOCUMENTS

| | | |
|---|---|---|
| 10,450,069 B2 | 10/2019 | Lu et al. |
| 2002/0096509 A1 | 7/2002 | Von Mosshaim et al. |
| 2010/0050665 A1* | 3/2010 | Oswald .................. F25D 17/06 |
| | | 700/282 |
| 2010/0158660 A1 | 6/2010 | Radhakrishnan |
| 2015/0059384 A1* | 3/2015 | Burd ..................... B64D 13/06 |
| | | 62/412 |
| 2017/0122647 A1 | 5/2017 | Burd |
| 2021/0139148 A1* | 5/2021 | Burd ..................... B64D 11/04 |
| 2022/0024606 A1 | 1/2022 | Freyling |

\* cited by examiner

VEHICLE REFRIGERATION SYSTEM FOR FOOD CARTS

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The technical field relates generally to food preparation, food storage/transport, and, more specifically, to a systems for temperature-controlled transport of food.

BACKGROUND

A food cart or a serving cart is a mobile device set up to hold and bring food and beverages to consumers. Food carts usually have one or more shelves or surfaces and four wheels, which allows the server to transport the food and beverages from the kitchen or food preparation area to the consumers. Various different types of food carts are available for satisfying the needs of different uses and industries. For example, an airline service trolley, also known as an airline catering trolley, airline meal trolley, or trolley cart, is a small serving cart supplied by an air carrier for use by flight attendants inside the aircraft for transport of beverages, airline meals, and other items during a flight. An airline service trolley is usually a rigid box form with caster wheels at each corner that can be braked to hold the trolley in position. The front and rear of an airline service trolley has doors, and handles are provided at the top. Yet another type of food cart is a catering trolley, which is similar to an airline service trolley, except that the catering trolley is used to quickly transfer equipment, food, and beverages at catered events. In this document, the term food cart will be used to refer to any wheeled devices used for transporting food over small distances to consumers, including serving carts, airline service trolleys and catering trolleys.

A well-known problem associated with food carts involves temperature control during storage and/or transport. Food carts are often filled with perishable food and beverages before the food carts are transported to their final destination. Catering trolleys, for example, are filled with food and beverages at the food preparation location before said trolleys are transported by truck in a refrigerated container to an event space where the food is consumed. Airline service trolleys are also filled with food before they are transported by refrigerated container to an airplane. The structure of food carts and refrigerated containers, however, do not allow for efficient temperature control of the food within food carts.

A refrigerated container or reefer is an intermodal container (or shipping container) used in intermodal freight transport that is capable of refrigeration for the transportation of temperature-sensitive, perishable cargo such as fruits, vegetables, meat, and other similar items. Refrigerated containers are capable of controlling temperatures within a particular range. Current refrigerated containers, however, simply cool the ambient air within the container. When a container is filled with food carts and other equipment, said cooled air can stagnate will not circulate in an optimal manner, thereby decreasing its ability to cool the food being transported. This is compounded by the fact that food carts are often enclosed, which further inhibits the cooling of air within the food carts themselves. This leads to inefficiencies in controlling the temperature of food within food carts within refrigerated containers.

Therefore, a need exists for improvements over the prior art, and, more particularly, for more efficient systems and methods for transporting food in food carts in a temperature-controlled manner.

SUMMARY

A vehicle refrigeration system for food carts is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a system for temperature-controlled transport of food on a vehicle includes a plurality of food carts, wherein each food cart includes a first opening for ingress of air and a second opening for egress of air and a refrigeration system. The refrigeration system includes a refrigeration unit located within a cargo area of the vehicle, the refrigeration unit comprising a compressor, a condenser, an evaporator, and a power connector for connecting the refrigeration unit to a power source, a first plurality of air ducts configured to convey pressurized air from the refrigeration unit to the plurality of food carts within the cargo area, the first plurality of air ducts including a plurality of air outlets configured to interface with the plurality of food carts, a second plurality of air ducts configured to convey air from the plurality of food carts to the refrigeration unit, the second plurality of air ducts including a plurality of air inlets configured to interface with the plurality of food carts, wherein each of the plurality of air outlets and air inlets includes a spring-loaded valve configured for automatically opening when a food cart of the plurality of food carts rests against the valve, and for automatically closing when said food cart no longer rests against the valve, one or more fans configured for circulating air within the first and second plurality of air ducts, and, an ultraviolet (UV) light sterilization system located within the first and second plurality of air ducts.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the claimed subject matter and together with the description, serve to explain the principles of the disclosed embodiments. The embodiments illustrated herein are presently preferred, it being understood, however, that the invention is not limited to the precise arrangements and instrumentalities shown, wherein:

DETAILED DESCRIPTION

The following detailed description refers to the accompanying drawings. Wherever possible, the same reference numbers are used in the drawings and the following description to refer to the same or similar elements. While embodiments herein may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed embodiments improve upon the prior art by providing a system for efficiently controlling the temperature of food carts during storage or transport within a transport container or the cargo area of a vehicle such as a truck or cargo van. The claimed embodiments deal with the problem of inefficient cooling of food within food carts within a transport container by utilizing a system of air ducts that provide cooled pressurized air directly to openings within the food carts. Specifically, the claimed embodiments provide a system that circulates cool, pressurized air within the interior volume of food carts, thereby more efficiently cooling the food within said carts. Therefore, the claimed embodiments allow for a more efficient method and system of cooling food within food carts within transport containers during storage or transport.

Figure 1:
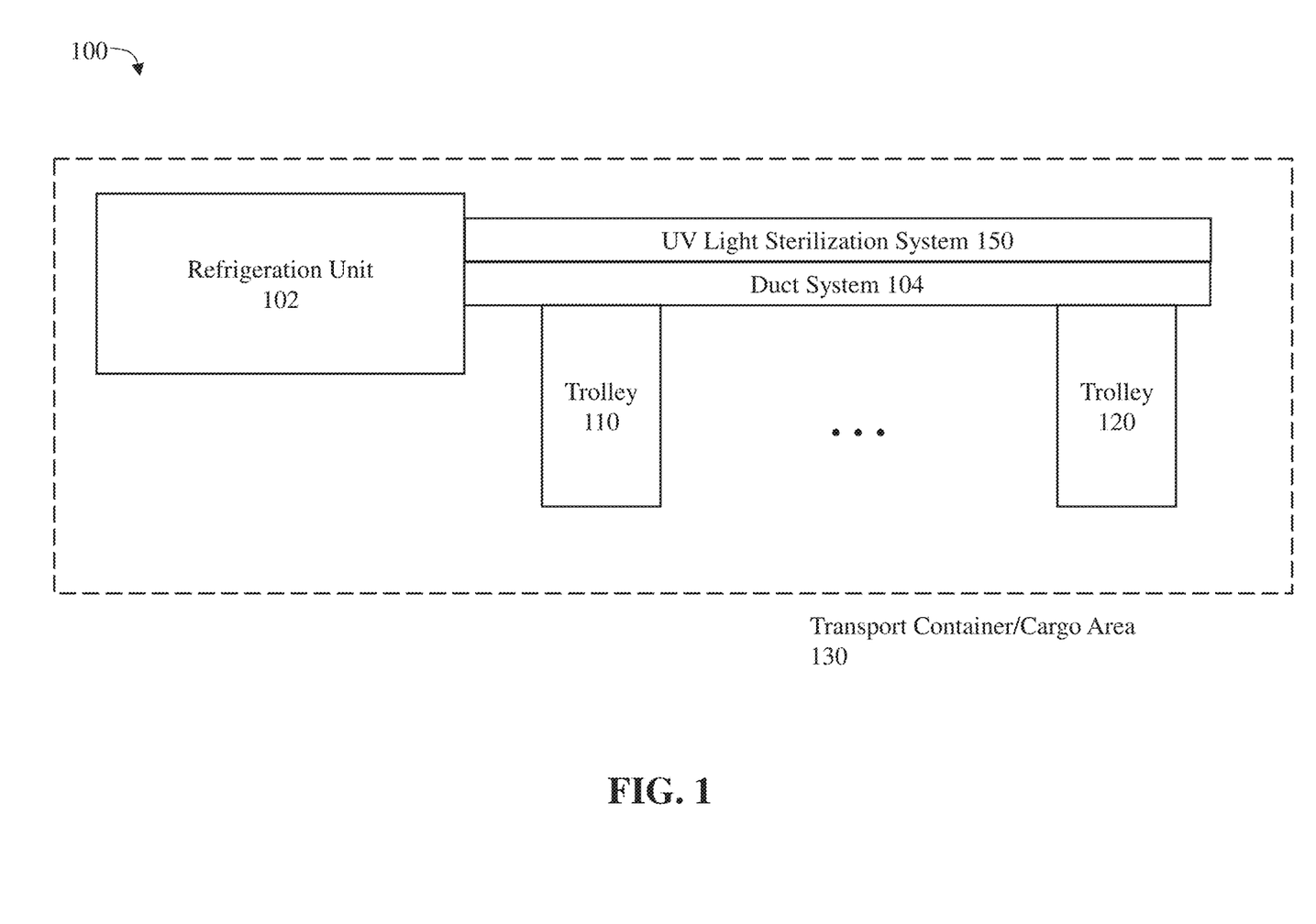
FIG. 1 is a block diagram showing the main components of a vehicle refrigeration system for food carts, according to an example embodiment.

FIG. 1 is a block diagram showing the main components of a vehicle refrigeration system for food carts 100, according to an example embodiment. FIG. 1 shows that the refrigeration system comprises a refrigeration unit 102 located within a transport container or cargo area of a vehicle 130, wherein the refrigeration unit comprises a compressor, a condenser, an evaporator, and a power connector for connecting the refrigeration unit to a power source. The refrigeration system includes a first plurality of air ducts (a subset of air ducts 104) configured to convey pressurized air from the refrigeration unit 102 to a plurality of food carts 110-120 within the transport container or cargo area of a vehicle 130. The first plurality of air ducts includes a plurality of air outlets configured to interface with the plurality of food carts. The refrigeration system also includes a second plurality of air ducts (a subset of air ducts 104) configured to convey air from the plurality of food carts 110-120 to the refrigeration unit 102. The second plurality of air ducts include a plurality of air inlets configured to interface with the plurality of food carts. Air ducts are conduits or passages used in heating, ventilation, and air conditioning (HVAC) to deliver and remove air. They may be composed of galvanized steel, aluminum, polyurethane, fiberglass, flexible ducting, fabric ducting, PVC, and the like.

The refrigeration unit comprises a compressor, which is a mechanical device that increases the pressure of a gas (in this case, a coolant such as freon) by reducing its volume, a condenser, which is a heat exchanger used to condense the coolant into a liquid state through cooling, and an evaporator, which is a device used to turn the liquid form of the coolant into its gaseous form (a vapor), therefore changing the substance's state of matter. The refrigeration unit also includes a power connector for connecting the refrigeration unit to a power source. The power connector may be an electrical conductor and conduit (such as an electrical cord) with a plug on its end.

Each of the plurality of air outlets and air inlets includes a spring-loaded valve (discussed in more detail with reference to FIGS. 5-6 below) configured for automatically opening when a food cart of the plurality of food carts rests against the valve, and for automatically closing when said food cart no longer rests against the valve. The refrigeration system also includes one or more fans configured for circulating air within the first and second plurality of air ducts and an ultraviolet (UV) light sterilization system 150 located within the first and second plurality of air ducts. A fan is a powered machine used to create a flow of air that consists of a rotating arrangement of vanes or blades.

A transport container is an enclosed compartment with an interior volume that may be filled with goods for transport on a vehicle, such as a truck, a ship, a train, or an airplane. A transport container may be an intermodal container, often called a shipping container or a freight container, which is a large, standardized shipping container, designed and built for intermodal freight transport, meaning the container can be used across different modes of transport (ship, air, rail, or truck) without unloading and reloading the cargo. Intermodal containers are used to store and transport materials and products efficiently and securely in the containerized intermodal freight transport system. Intermodal containers are also referred to as container, cargo container, freight container, shipping container, sea container, ocean container, container van, etc. Intermodal containers exist in many types and a number of standardized sizes, but most containers are general purpose containers—durable closed rectangular boxes, made of rust-retardant steel. Temperature controlled containers are either insulated, refrigerated, and/or heated containers, for perishable goods.

A cargo truck or cargo van is a type of light to heavy-duty road vehicle used for transporting goods. The typical cargo truck or cargo van has a cargo area and is bigger than a common car, a pickup truck, or an SUV. The cargo area of a cargo truck or cargo van is large enough is accommodate a plurality of goods for transport.

The UV light sterilization system 150 located within the first and second plurality of air ducts utilize the UV germicidal irradiation process, which is a disinfection method that uses short-wavelength ultraviolet (ultraviolet C or UV-C)

light to kill or inactivate microorganisms by destroying nucleic acids and disrupting their DNA, leaving them unable to perform vital cellular functions. UV light is electromagnetic radiation with wavelengths shorter than visible light but longer than X-rays. UV light is categorized into several wavelength ranges, with short-wavelength UV (UV-C) considered germicidal UV. Wavelengths between about 200 nm and 300 nm are strongly absorbed by nucleic acids. The absorbed energy can result in defects that can prevent replication or can prevent the expression of necessary proteins, resulting in the death or inactivation of the organism. Germicidal UV light for disinfection may be generated by one or more mercury-vapor lamps.

Figure 2:
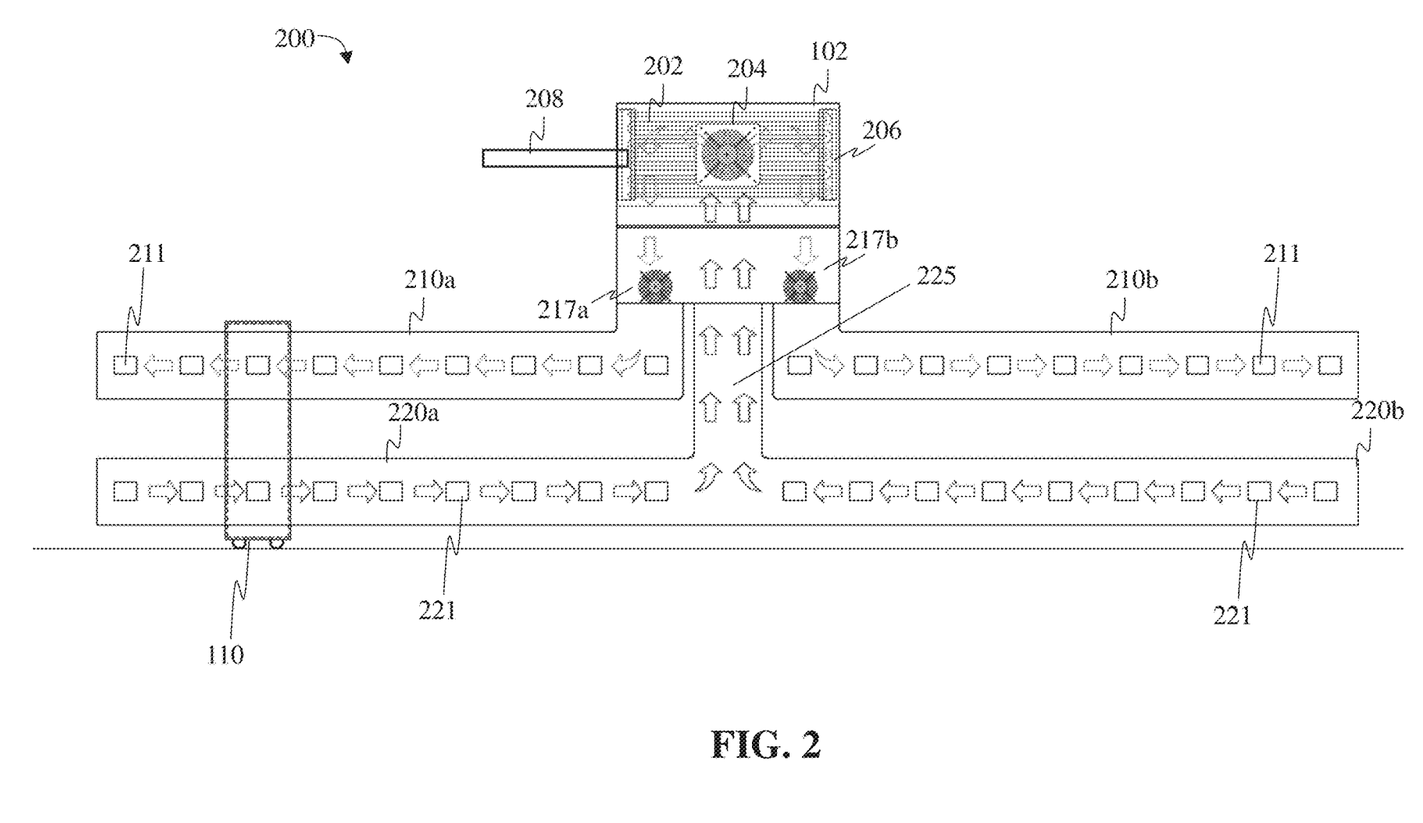
FIG. 2 is an illustration showing the main components of the vehicle refrigeration system for food carts, according to an example embodiment.
Figure 3:
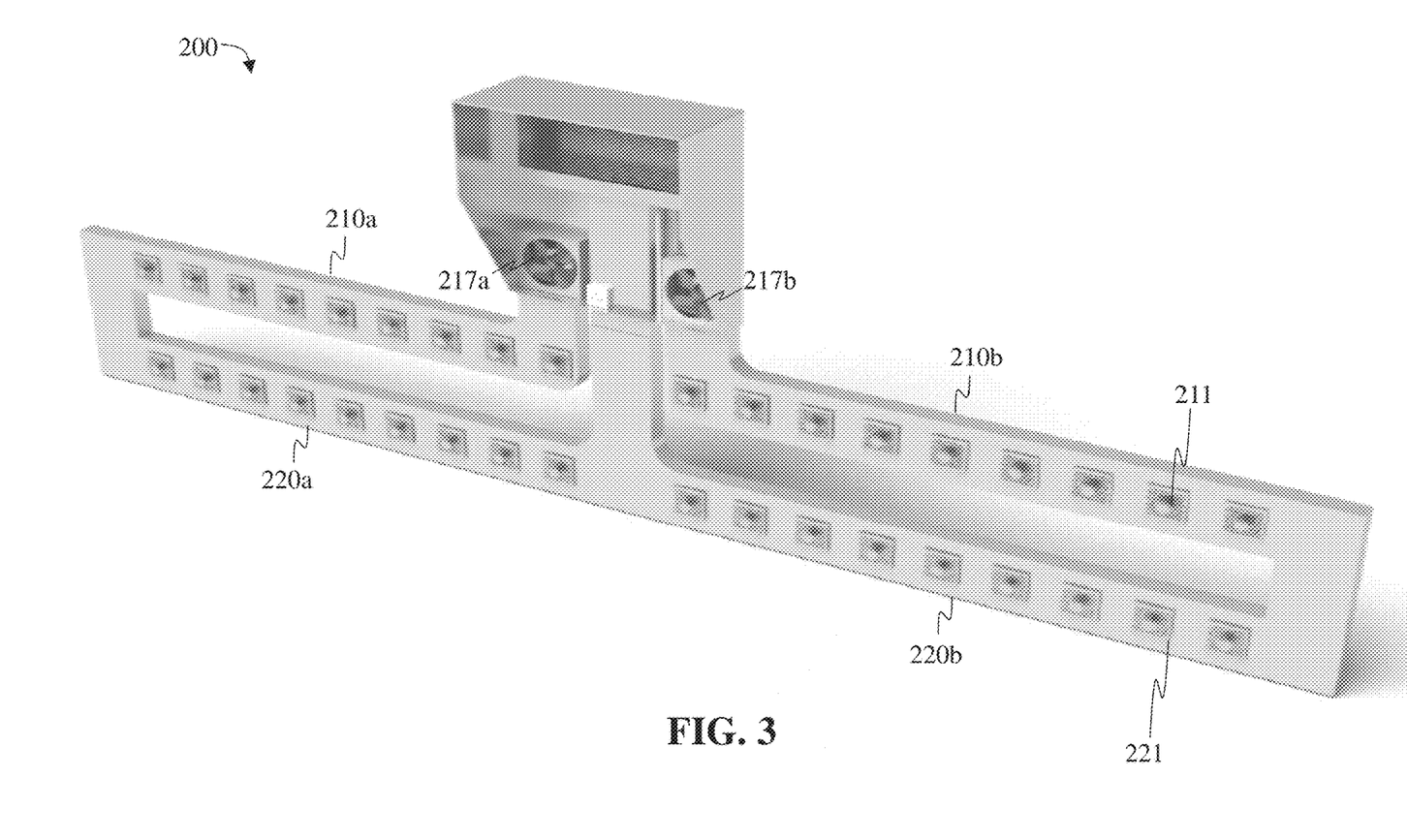
FIG. 3 is another illustration showing the main components of the vehicle refrigeration system for food carts, according to an example embodiment.

FIG. 2 is an illustration showing the main components of the vehicle refrigeration system for food carts, according to an example embodiment. FIG. 3 is another illustration showing the main components of the vehicle refrigeration system for food carts, according to an example embodiment.

FIG. 2 more clearly shows the refrigeration system 200 includes the refrigeration unit 102 comprising a compressor 202, a condenser 204, an evaporator 206, and a power connector 208 for connecting the refrigeration unit to a power source. The refrigeration system includes a first plurality of air ducts 210a, 210b configured to convey pressurized air from the refrigeration unit 102 to a plurality of food carts (cart 110 shown) within the transport container or cargo area of a vehicle 130. The first plurality of air ducts 210a, 210b includes a plurality of air outlets 211 configured to interface with the plurality of food carts. The refrigeration system also includes a second plurality of air ducts 220a, 220b configured to convey air from the plurality of food carts to the refrigeration unit 102. The return air travels via duct 225 (perpendicular to ducts 210a, 210b) to return to the refrigeration unit. The second plurality of air ducts 220a, 220b include a plurality of air inlets 221 configured to interface with the plurality of food carts. The refrigeration system 200 also includes one or more fans 217a, 217b configured for circulating air within the first and second plurality of air ducts.

The first plurality of air ducts 210a, 210b may comprise a first air duct 210a and a second air duct 210b, wherein the first air duct extends in an opposite direction from the second air duct. The first air duct may also be colinear with the second air duct, as shown in FIG. 2. Also, at least one of the one or more fans 217a may located at a commencement of the first air duct 210a and at least one of the one or more fans 217b may located at a commencement of the second air duct 210b. Further, second plurality of air ducts 220a, 220b may comprise a third air duct 220a and a fourth air duct 220b, wherein the third air duct extends in an opposite direction from the fourth air duct. The third air duct may also be colinear with the fourth air duct, as shown in FIG. 2.

Note that each outlet of the first plurality of air outlets 211 may comprise an opening in a duct of the first plurality of air ducts 210a, 210b, wherein said opening is configured to allow for egress of air from said duct. Also, each inlet of the first plurality of air inlets 221 may comprise an opening in a duct of the second plurality of air ducts 220a, 220b, wherein said opening is configured to allow for ingress of air from a food cart of the plurality of food carts.

Figure 4:
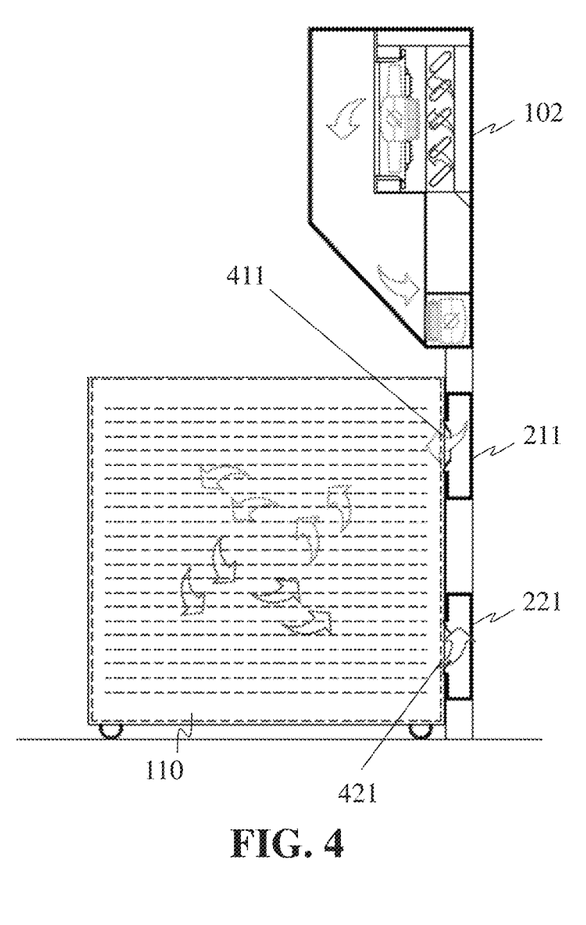
FIG. 4 is an illustration showing a food cart coupling with the vehicle refrigeration system for food carts, according to an example embodiment.

FIG. 4 is an illustration showing a food cart 110 coupling with the vehicle refrigeration system for food carts, according to an example embodiment. FIG. 4 shows that the air outlet 211 of the first duct 210a is configured to interface with the food cart 110, namely, interface with an opening 411 in the food cart that allows access to the interior volume of the food cart. This allows cooled and pressurized air to enter the interior of the food cart and control the temperature of the food within it. FIG. 4 also shows that the air inlet 221 of the third duct 220a is configured to interface with an opening 421 in the food cart that allows access to the interior volume of the food cart. This allows used or warmed/heated air to exit the interior of the food cart (to be replenished with cooled air) and control the temperature of the food within it. Note that each of the plurality of air outlets and air inlets includes a spring-loaded valve configured for automatically opening when a food cart of the plurality of food carts rests against the valve, and for automatically closing when said food cart no longer rests against the valve. FIG. 4 shows that when the food cart 110 rests against the valve of the outlet 211 and the valve of the inlet 221, said valves open to allow air to be circulated between the refrigeration system and the interior volume of the food cart 110.

Figure 5:
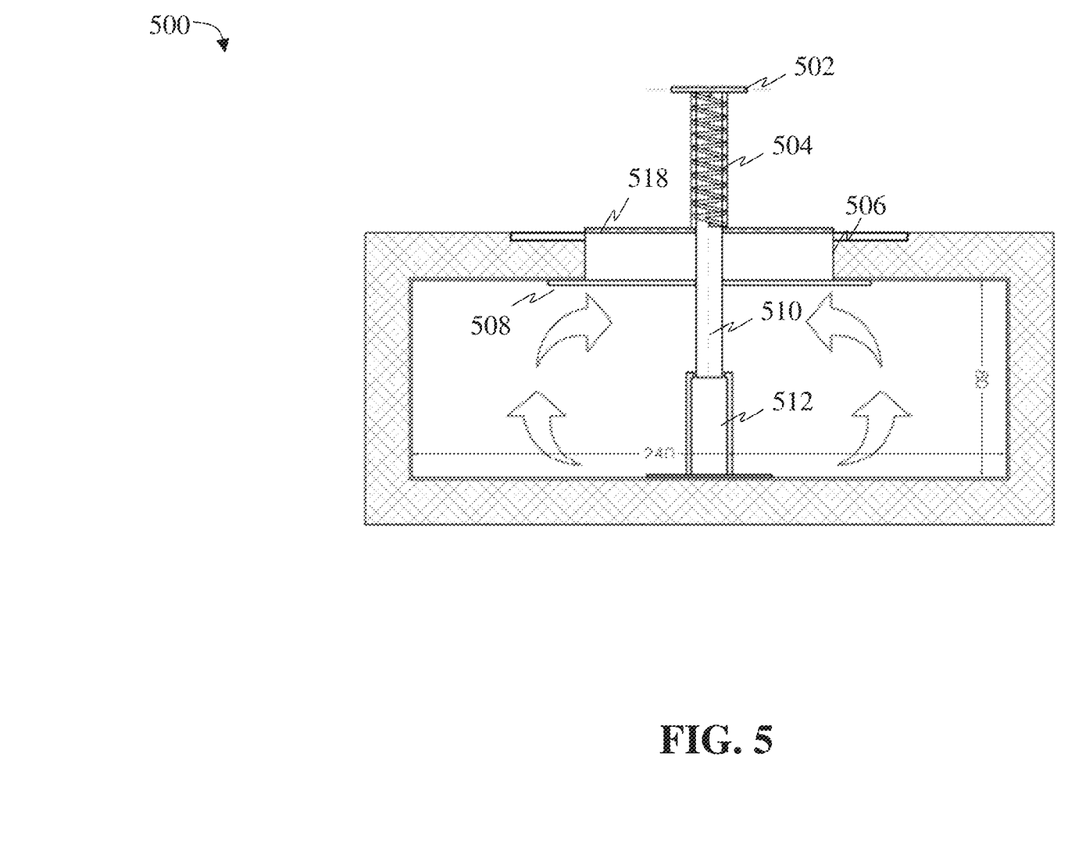
FIG. 5 is an illustration showing an airflow valve, in a closed position, of the vehicle refrigeration system for food carts, according to an example embodiment.
Figure 6:
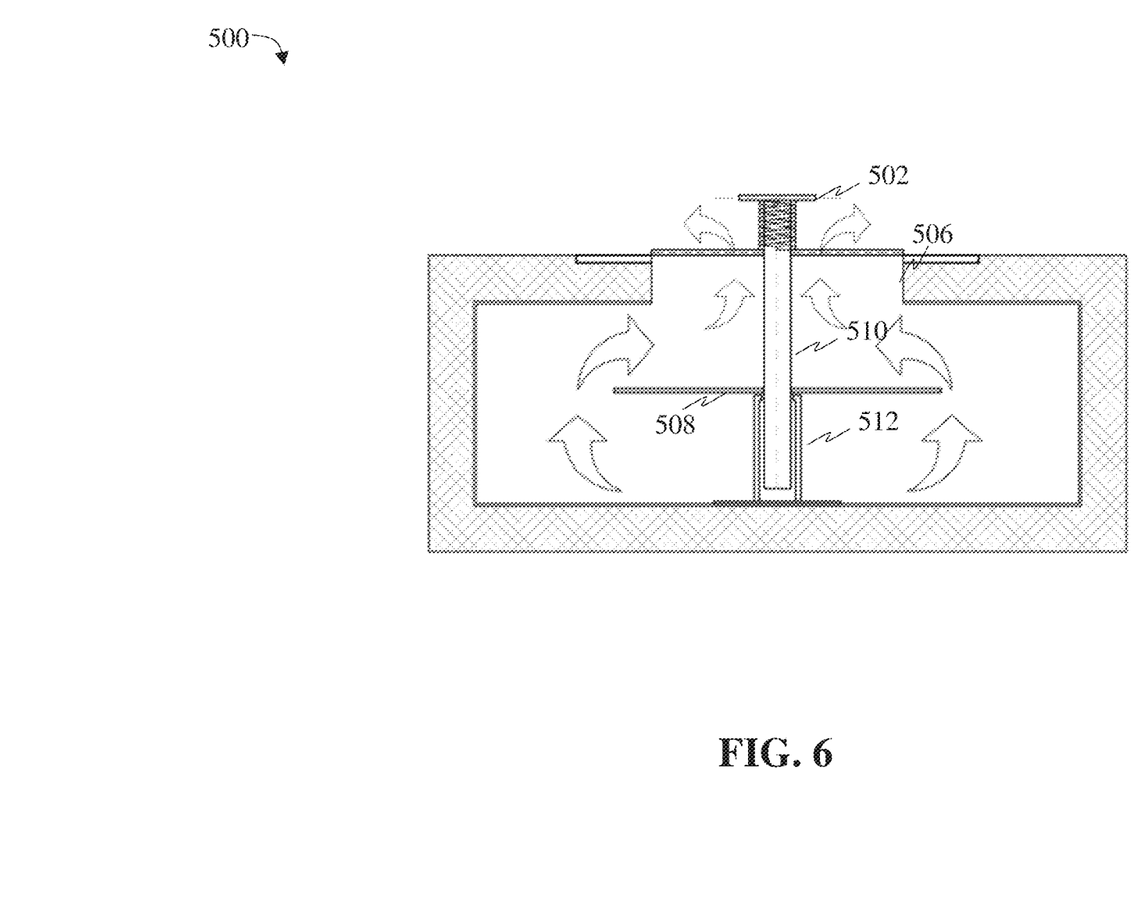
FIG. 6 is an illustration showing an airflow valve, in an open position, of the vehicle refrigeration system for food carts, according to an example embodiment.

FIG. 5 is an illustration showing an airflow valve 500, in a closed position, of the vehicle refrigeration system for food carts, while FIG. 6 shows the airflow valve 500, in an open position, of the vehicle refrigeration system for food carts, according to an example embodiment. FIGS. 5 and 6 show that the spring-loaded valve 500 comprises a cover 508 configured for covering an opening 506 in an air duct of the first or second plurality of air ducts. the cover may be a flat surface that is configured to completely cover the opening so as to prevent ingress or egress of air when the valve is in the closed position, as shown in FIG. 5. FIG. 5 also shows a permeable surface 518 (such as a screen or grate) covering the top of the opening 506.

FIGS. 5 and 6 also show that the spring-loaded valve 500 comprises a shaft 510 that extends from the interior of the duct to the exterior of the duct, such that the shaft protrudes from the duct. The shaft 510 also includes a stopper 502 at its distal end, wherein the stopper may be a section of the shaft with a diameter greater than the diameter of the shaft, such as a disc, a sphere, or a cylinder. The proximal end of the shaft 510 may rest within a track 512. The track may be a cylindrical structure that surrounds and holds the shaft in an upright position as the shaft moves up and down. The shaft 510 is coupled to the cover 508 such that the cover is located between the stopper 502 and the track 512.

FIGS. 5 and 6 also show that the spring-loaded valve 500 comprises a spring 504 coupled to the distal end of the shaft 510. The spring 504 surrounds the shaft 510 and the spring is lodged between the stopper 502 at the top end and the permeable surface 518 at the lower end. The spring 504 configured to exert a force against both the stopper 502 and the permeable surface 518. Therefore, in the closed position (see FIG. 5) the spring 504 pushes the shaft 510 upwards, which pushes the cover 508 to a first position that completely covers said opening 506 in the air duct. Thus, FIG. 5 shows a situation where air is not allowed to pass through the opening 506 and therefore air cannot escape from the air duct.

However, when a food cart 110 of the plurality of food carts rests against or pushes against the shaft 510 such that the shaft moves downwards (see FIG. 6), then the cover 508 is also moved downwards to a second position that no longer covers said opening 506 in said air duct, and the spring 504 is compressed. Thus, FIG. 6 shows a situation where air is allowed to pass through the opening 506 and therefore air can pass from the air duct to the interior of the food cart.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A refrigeration system for an intermodal container, comprising:
   a) a refrigeration unit located within the intermodal container, the refrigeration unit comprising a compressor, a condenser, an evaporator, and a power connector for connecting the refrigeration unit to a power source;
   b) a first plurality of air ducts configured to convey pressurized air from the refrigeration unit to a plurality of food carts within the intermodal container, the first plurality of air ducts including a plurality of air outlets configured to interface with the plurality of food carts, wherein the first plurality of air ducts includes a first pair of air ducts that extend in opposite directions to the right and left of the refrigeration unit;
   c) a second plurality of air ducts configured to convey air from the plurality of food carts to the refrigeration unit, the second plurality of air ducts including a plurality of air inlets configured to interface with the plurality of food carts, wherein the second plurality of air ducts are connected to ends of the first plurality of air ducts and are located below the first plurality of air ducts such that the plurality of air inlets is located below the plurality of air outlets, wherein the second plurality of air ducts includes a second pair of air ducts that extend in opposite directions to the right and left of the refrigeration unit, and wherein the second plurality of air ducts merge into a single duct upon meeting the refrigeration unit;
   d) wherein each of the plurality of air outlets and air inlets includes a spring-loaded valve configured for automatically opening when a food cart of the plurality of food carts rests against the valve, and for automatically closing when said food cart no longer rests against the valve;
   e) one or more fans configured for circulating air within the first and second plurality of air ducts; and
   f) an ultraviolet (UV) light sterilization system located within the first and second plurality of air ducts;
   wherein the intermodal container comprises a closed rectangular box composed of rust-retardant steel and insulation.

2. The refrigeration system of claim 1, wherein the first plurality of air ducts comprises a first air duct and a second air duct, wherein the first air duct extends in an opposite direction from the second air duct.

3. The refrigeration system of claim 2, wherein each outlet of the first plurality of air outlets comprises an opening in a duct of the first plurality of air ducts, wherein said opening is configured to allow for egress of air from said duct.

4. The refrigeration system of claim 3, wherein the second plurality of air ducts comprises a third air duct and a fourth air duct, wherein the third air duct extends in an opposite direction from the fourth air duct.

5. The refrigeration system of claim 4, wherein each inlet of the first plurality of air inlets comprises an opening in a duct of the second plurality of air ducts, wherein said opening is configured to allow for ingress of air from a food cart of the plurality of food carts.

6. The refrigeration system of claim 5, wherein at least one of the one or more fans is located at a commencement of the first air duct.

7. The refrigeration system of claim 6, wherein at least one of the one or more fans is located at a commencement of the second air duct.

8. The refrigeration system of claim 7, wherein the first air duct is colinear with the second air duct.

9. The refrigeration system of claim 8, wherein the third air duct is colinear with the fourth air duct.

10. The refrigeration system of claim 9, wherein the spring-loaded valve comprises:
    a cover configured for covering an opening in an air duct of the first or second plurality of air ducts;
    a shaft coupled to the cover;
    a spring coupled to the shaft, the spring configured to push the cover to a first position that completely covers said opening in said air duct;
    wherein when a food cart of the plurality of food carts rests against the shaft, the shaft moves the cover to a second position that no longer covers said opening in said air duct, and the spring is compressed.

11. A refrigeration system for an intermodal container, comprising:
    a) a refrigeration unit located within the intermodal container, the refrigeration unit comprising a compressor, a condenser, an evaporator, and a power connector for connecting the refrigeration unit to a power source;
    b) a first plurality of air ducts configured to convey pressurized air from the refrigeration unit to a plurality of food carts within the intermodal container, the first plurality of air ducts including a plurality of air outlets configured to interface with the plurality of food carts, wherein the first plurality of air ducts includes a first pair of air ducts that extend in opposite directions to the right and left of the refrigeration unit;
    c) a second plurality of air ducts configured to convey air from the plurality of food carts to the refrigeration unit, the second plurality of air ducts including a plurality of air inlets configured to interface with the plurality of food carts, wherein the second plurality of air ducts are connected to ends of the first plurality of air ducts and are located below the first plurality of air ducts such that the plurality of air inlets is located below the plurality of air outlets, wherein the second plurality of air ducts includes a second pair of air ducts that extend in opposite directions to the right and left of the refrigeration unit, and wherein the second plurality of air ducts merge into a single duct upon meeting the refrigeration unit;
    d) wherein each of the plurality of air outlets and air inlets includes a spring-loaded valve configured for automatically opening when a food cart of the plurality of food carts rests against the valve, and for automatically closing when said food cart no longer rests against the valve;
    e) two fans configured for circulating air within the first and second plurality of air ducts; and
    f) an ultraviolet (UV) light sterilization system located within the first and second plurality of air ducts;
    wherein the intermodal container comprises a closed rectangular box composed of rust-retardant steel and insulation.

12. The refrigeration system of claim 11, wherein the first plurality of air ducts comprises a first air duct and a second air duct, wherein the first air duct extends in an opposite direction from the second air duct.

13. The refrigeration system of claim 12, wherein each outlet of the first plurality of air outlets comprises an opening in a duct of the first plurality of air ducts, wherein said opening is configured to allow for egress of air from said duct.

14. The refrigeration system of claim 13, wherein the second plurality of air ducts comprises a third air duct and a fourth air duct, wherein the third air duct extends in an opposite direction from the fourth air duct.

15. The refrigeration system of claim 14, wherein each inlet of the first plurality of air inlets comprises an opening in a duct of the second plurality of air ducts, wherein said opening is configured to allow for ingress of air from a food cart of the plurality of food carts.

16. The refrigeration system of claim 15, wherein at least one of the two fans is located at a commencement of the first air duct.

17. The refrigeration system of claim 16, wherein at least one of the two fans is located at a commencement of the second air duct.

18. The refrigeration system of claim 17, wherein the first air duct is colinear with the second air duct.

19. The refrigeration system of claim 18, wherein the third air duct is colinear with the fourth air duct.

20. A system for temperature-controlled transport of food on an intermodal container, comprising:
1) a plurality of food carts, wherein each food cart includes a first opening for ingress of air and a second opening for egress of air; and
2) a refrigeration system comprising:
   a) a refrigeration unit located within the intermodal container, the refrigeration unit comprising a compressor, a condenser, an evaporator, and a power connector for connecting the refrigeration unit to a power source;
   b) a first plurality of air ducts configured to convey pressurized air from the refrigeration unit to the plurality of food carts within the intermodal container, the first plurality of air ducts including a plurality of air outlets configured to interface with the plurality of food carts, wherein the first plurality of air ducts includes a first pair of air ducts that extend in opposite directions to the right and left of the refrigeration unit;
   c) a second plurality of air ducts configured to convey air from the plurality of food carts to the refrigeration unit, the second plurality of air ducts including a plurality of air inlets configured to interface with the plurality of food carts, wherein the second plurality of air ducts are connected to ends of the first plurality of air ducts and are located below the first plurality of air ducts such that the plurality of air inlets is located below the plurality of air outlets, wherein the second plurality of air ducts includes a second pair of air ducts that extend in opposite directions to the right and left of the refrigeration unit, and wherein the second plurality of air ducts merge into a single duct upon meeting the refrigeration unit;
   d) wherein each of the plurality of air outlets and air inlets includes a spring-loaded valve configured for automatically opening when a food cart of the plurality of food carts rests against the valve, and for automatically closing when said food cart no longer rests against the valve;
   e) one or more fans configured for circulating air within the first and second plurality of air ducts; and
   f) an ultraviolet (UV) light sterilization system located within the first and second plurality of air ducts;
wherein the intermodal container comprises a closed rectangular box composed of rust-retardant steel and insulation.

\* \* \* \* \*